(12) United States Patent
Binyamin

(10) Patent No.: US 8,316,122 B2
(45) Date of Patent: *Nov. 20, 2012

(54) METHOD AND SYSTEM FOR PROVIDING REMOTE ACCESS TO APPLICATIONS

(75) Inventor: Shuki Binyamin, Jerusalem (IL)

(73) Assignee: AppToU Technologies Ltd, Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/303,962

(22) Filed: Nov. 23, 2011

(65) Prior Publication Data

US 2012/0072487 A1     Mar. 22, 2012

Related U.S. Application Data

(63) Continuation of application No. 12/301,764, filed as application No. PCT/IB2007/001358 on May 25, 2007, now Pat. No. 8,073,941.

(30) Foreign Application Priority Data

May 25, 2006 (IL) .......................... 175950
Jul. 27, 2006 (IL) .......................... 177145

(51) Int. Cl.
    *G06F 15/173* (2006.01)
(52) U.S. Cl. ........ 709/223; 709/203; 709/217; 709/224; 718/105
(58) Field of Classification Search .................. 709/203, 709/217, 219, 223, 224; 718/104, 105
See application file for complete search history.

(56) References Cited

U.S. PATENT DOCUMENTS

| 4,317,114 A | 2/1982 | Walker |
| 4,823,108 A | 4/1989 | Pope |
| 4,949,248 A | 8/1990 | Caro |
| 5,541,662 A | 7/1996 | Adams et al. |
| 6,259,405 B1 * | 7/2001 | Stewart et al. ................ 342/457 |
| 6,370,527 B1 * | 4/2002 | Singhal ............................ 1/1 |
| 6,384,846 B1 | 5/2002 | Hiroi |
| 6,415,323 B1 * | 7/2002 | McCanne et al. ............. 709/225 |
| 6,728,704 B2 * | 4/2004 | Mao et al. ...................... 1/1 |
| 6,772,217 B1 | 8/2004 | Baumann et al. |
| 7,133,863 B2 * | 11/2006 | Teng et al. .................... 707/708 |
| 7,260,599 B2 * | 8/2007 | Bauch et al. .................. 709/202 |

(Continued)

FOREIGN PATENT DOCUMENTS

WO     2007138429     12/2007

OTHER PUBLICATIONS

International Search Report and Written Opinion mailed Jun. 30, 2008 for International Application No. PCT/IB2007/001358.

(Continued)

*Primary Examiner* — Lashonda Jacobs
(74) *Attorney, Agent, or Firm* — Sheppard, Mullin, Richter & Hampton LLP

(57) ABSTRACT

A method of remotely providing an application includes receiving, at an access server, a request for an application from a client. One or more application servers which are capable of providing the requested application are identified base at least in part on a resource of the identified one or more application servers. The client is provided with the identified one or more application servers which are capable of providing the application.

21 Claims, 7 Drawing Sheets

U.S. PATENT DOCUMENTS

| | | | |
|---|---|---|---|
| 7,308,475 B1* | 12/2007 | Pruitt et al. | 709/203 |
| 2003/0074301 A1* | 4/2003 | Solomon | 705/37 |
| 2003/0105846 A1* | 6/2003 | Zhao et al. | 709/221 |
| 2003/0139934 A1* | 7/2003 | Mandera | 705/1 |
| 2003/0142149 A1 | 7/2003 | Brown et al. | |
| 2003/0195813 A1* | 10/2003 | Pallister et al. | 705/26 |
| 2003/0220835 A1* | 11/2003 | Barnes, Jr. | 705/14 |
| 2003/0229665 A1* | 12/2003 | Ryman | 709/203 |
| 2004/0006591 A1* | 1/2004 | Matsui et al. | 709/203 |
| 2004/0030627 A1* | 2/2004 | Sedukhin | 705/36 |
| 2004/0030740 A1* | 2/2004 | Stelting | 709/201 |
| 2004/0043758 A1* | 3/2004 | Sorvari et al. | 455/414.1 |
| 2004/0122926 A1* | 6/2004 | Moore et al. | 709/223 |
| 2004/0148375 A1 | 7/2004 | Levett et al. | |
| 2004/0153558 A1 | 8/2004 | Gunduc et al. | |
| 2004/0201608 A1 | 10/2004 | Ma et al. | |
| 2005/0165656 A1* | 7/2005 | Frederick et al. | 705/26 |
| 2005/0188329 A1* | 8/2005 | Cutler et al. | 715/804 |
| 2005/0234928 A1* | 10/2005 | Shkvarchuk et al. | 707/100 |
| 2005/0257137 A1 | 11/2005 | Weber et al. | |
| 2006/0184626 A1* | 8/2006 | Agapi et al. | 709/205 |
| 2006/0203001 A1 | 9/2006 | Van Der Stok et al. | |
| 2007/0192329 A1 | 8/2007 | Croft et al. | |

OTHER PUBLICATIONS

International Search Report and Written Opinion mailed Jul. 17, 2008 for International Application No. PCT/IB2007/001365.
Non-Final Office Action mailed Jul. 19, 2011 for U.S. Appl. No. 12/301,767.

* cited by examiner

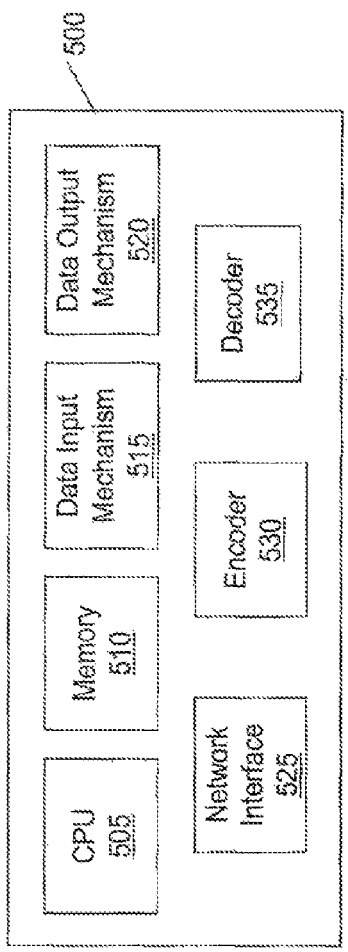
Fig. 5A
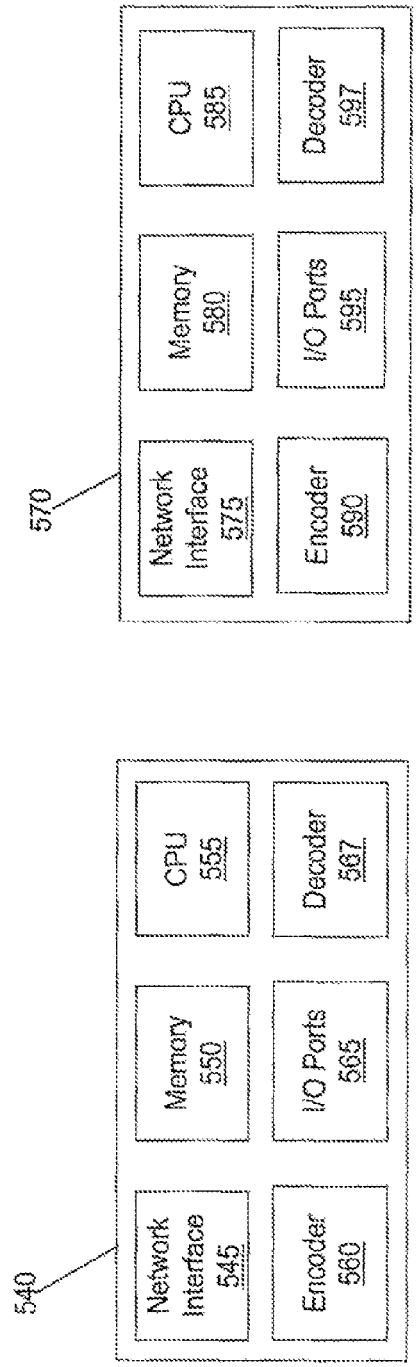
Fig. 5B
Fig. 5C

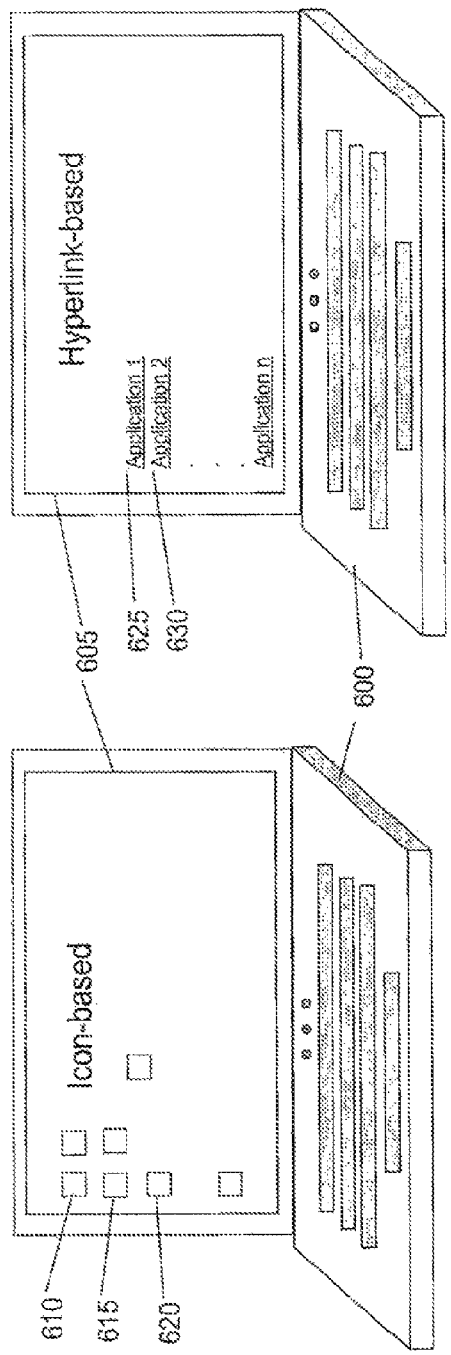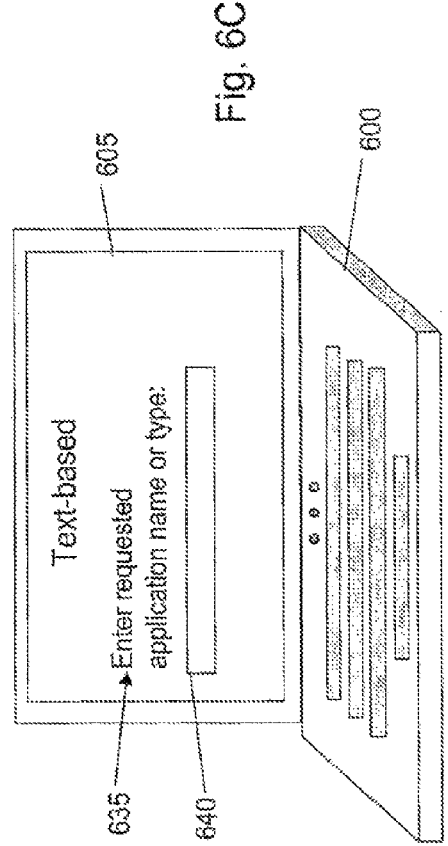

METHOD AND SYSTEM FOR PROVIDING REMOTE ACCESS TO APPLICATIONS

CROSS-REFERENCE TO RELATED APPLICATIONS

This application is a continuation of and incorporates by reference Ser. No. 12/301,764, filed Nov. 20, 2008, now U.S. Pat. No. 8,073,941, entitled "Method and System for Providing Remote Access to Applications," issued on Dec. 6, 2011, by inventor Shuki Binyamin, which claims the benefit of and incorporates by reference PCT/IB07/01358, entitled "Method and System for Providing Remote Access to Applications," filed May 25, 2007, by Shuki Binyamin. PCT/IB07/01358 claims the benefit of Israeli Patent Application No. 175,950, filed May 25, 2006, and Israeli Patent Application No. 177,145, filed Jul. 27, 2006.

FIELD OF INVENTION

The subject of the disclosure relates generally to server based computing. More specifically, the disclosure relates to a method, system, and computer-readable medium for remotely providing an application to a client through an application server based on identified resources of the client and/or the application server.

Background

In a server based computing environment, hardware upgrades, application deployment, technical support, and/or data storage can all be routed through and controlled by one or more terminal application servers. As such, businesses which need to support multiple clients can use server based computing to reduce application costs while ensuring that the applications are accessible by any or all of the supported clients. In addition to improved access and lower application costs, server based computing also enables enhanced security and eliminates the need for patch through software upgrades to a plurality of different clients. Traditional server based computing is generally implemented through remote desktop computing or remote application computing.

In remote desktop computing, one or more terminal application servers provide one or more clients with access to a plurality of software applications. To manage data transfer, the terminal application servers dedicate a separate data communication line to each client. Users can access the terminal server through their user devices (or clients) by authenticating into a network with a username and password, with an access card, based on biometric information, or by any other method. Each client serves as a remote desktop display capable of displaying applications which are provided by the terminal application server. The remote desktop is created by and handled within the terminal application server based on applications installed on the terminal application server. The clients also allow users to input data through a mouse, keyboard, etc. such that the users can interact with the application.

Traditional remote desktop computing is limited due to the high likelihood of terminal server overload. The terminal server is required to simultaneously provide access to multiple clients and is therefore required to simultaneously execute multiple applications. In organizations with large numbers of users, inadequate servers, or inadequate bandwidth, this simultaneous execution can overburden the terminal server(s), resulting in decreased production, system outages, and potentially lost data. Once overburdened, the remote desktop computing system is not able to relocate clients to another terminal server, even if one exists. As a result, computing speed and performance is reduced for all users. Traditional remote desktop computing is also limited due to conflicts which arise between applications which are simultaneously executed on clients, the inability of the terminal server to support more than one operating system, and the potential that users will be inadvertently granted access to restricted applications and/or data.

In remote application computing, a plurality of terminal application servers are used, each of which is dedicated to one or more applications. A user can use a remote client to authenticate through a network and access the terminal application server corresponding to a desired application. A single communication line is established between the client and the terminal application server for each application which is provided to the user. Remote application computing has several advantages over remote desktop computing, including a minimized risk of users inadvertently being granted access to restricted applications and a minimized risk of applications conflicting with one another. However, traditional remote application computing is limited because it requires a data communication channel for each provided application, resulting in a need for excessive bandwidth. In addition, clients which utilize remote application computing need expensive hardware capable of simultaneously handling a plurality of distinct communication channels if the client is to execute more than a single application at one time. Also, locally running the desktop on the client-requires an expensive operating system and hardware, can lead to security vulnerability, and increases the costs of infrastructure technology management.

Traditional server based computing is also limited because the way in which application data is provided to a client requires that the client have adequate graphics capabilities built in. This is because commands for forming objects on a client monitor are sent from the terminal application server directly to the client. In order to display data, the client has to process the commands using a graphical display algorithm such as Graphical Device Interface (GDI), QuickDraw, DirectX, Display PDF, OpenGL, X11, etc. Traditional server based computing is further limited by the inability to provide individual users with limited funds and/or limited computing resources with remote access to applications.

Thus, there is a need for a server based computing system in which bandwidth usage is minimized. There is also a need for a server based computing system in which the risk of application server overload is minimized. Further, there is a need for a server based computing system which is accessible by users with limited funds and/or limited computing resources.

SUMMARY

An exemplary method of remotely providing an application includes receiving, at an access server, a request for an application from a client. One or more application servers which are capable of providing the requested application are identified based at least in part on a resource of the identified one or more application servers. The client is provided with the identified one or more application servers which are capable of providing the application.

Another exemplary method of remotely providing an application includes receiving a request for an application from a client. An application server for providing the requested application to the client is identified based at least in part on a resource of the application server. An instruction is provided such that the client receives the requested application from the identified application server.

An exemplary computer-readable medium has computer-readable instructions stored thereon that, upon execution by a processor, cause the processor to mediate between a client and an application server. The instructions are configured to receive a request for an application from the client. An application server which is capable of providing the requested application to the client is identified. A resource of the application server is also identified, wherein the identified resource relates to a user preference received from a user of the client. The requested application is provided to the client through the identified application server only if the identified resource satisfies the user preference.

An exemplary access server system for identifying an application server includes a mediator application, a memory, and a processor. The mediator application includes computer code configured to receive a request for an application from a client. An application server which is capable of providing the requested application to the client is identified. A resource of the application server is also identified, wherein the identified resource relates to a user preference received from the client. The identified resource is provided to the client for use in a determination of whether the identified application server is to be used. The memory is configured to store the mediator application. The processor is coupled to the memory and configured to execute the mediator application.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

FIG. 5A is a block diagram illustrating a client in accordance with an exemplary embodiment.

FIG. 5B is a block diagram illustrating an application server in accordance with an exemplary embodiment.

FIG. 5C is a block diagram illustrating an access server in accordance with an exemplary embodiment.

FIG. 6A illustrates an icon-based graphical user interface for requesting an application in accordance with an exemplary embodiment.

FIG. 6B illustrates a hyperlink-based graphical user interface for requesting an application in accordance with an exemplary embodiment.

FIG. 6C illustrates a text-based graphical user interface for requesting an application in accordance with an exemplary embodiment.

DETAILED DESCRIPTION

Figure 1:
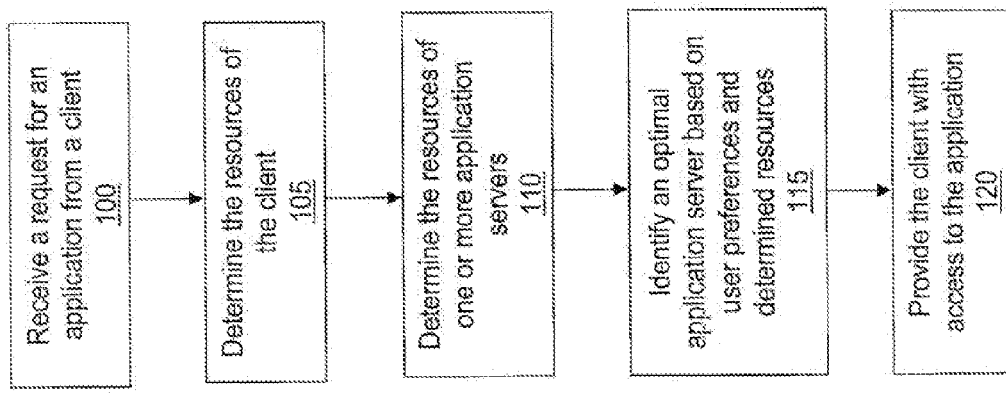
FIG. 1 is a flow diagram illustrating operations performed by an access server to determine an optimal application server for a given client in accordance with an exemplary embodiment.

FIG. 1 is a flow diagram illustrating operations performed by an access server to determine an optimal application server for a given client in accordance with an exemplary embodiment. Additional, fewer, or different operations may be performed in alternative embodiments. In an exemplary embodiment, the access server can be any type of server capable of communicating with a client and an application server. In the description which follows, various tasks and operations are described as being performed by the access server and other tasks and operations are described as being performed by the application server. This is not meant to be limiting as any of the tasks and operations performed by the access server may be performed by the application server in alternative embodiments. Similarly, any of the tasks and operations performed by the application server may be performed by the access server in alternative embodiments.

In an operation 100, the access server receives a request for an application from a client. The request can be sent from the client to the access server through a network. The network can be a wide area network (WAN) such as the Internet, a local area network (LAN) such as an Ethernet, a telecommunications network, or any other medium through which the client can send and/or receive data. The access server can receive the request for the application by any method known to those of skill in the art. In an alternative embodiment, the access server may be incorporated within the client such that direct communication between the client and the access server can occur.

In an exemplary embodiment, the client can be a desktop computer, a laptop computer, a personal digital assistant, a portable gaming unit, a wired gaming unit, a cellular telephone, a thin client, a set-top box, a portable multi-media player, or any other network accessible user device known to those of skill in the art. In another exemplary embodiment, the requested application can be a word processing application, a browsing application, a multi-media application, a spreadsheet application, an email application, a file management application, a voice over Internet protocol (VoIP) application, a gaming application, a music application, a video application, or any other application known to those of skill in the art.

In an exemplary embodiment, a user of the client can submit the request for the application through a network browser. For example, the user can open the network browser, enter a uniform resource locator (URL) corresponding to the access server, and provide authentication information to the access server to establish a communication channel with the access server. The authentication information can include a username, password, question response, selection, or any other information by which the access server can confidently identify the user and/or the client. The authentication information can be established during an enrollment process during which the user provides the access server with contact information, billing information, personal information, and/or information regarding the user's application preferences or available resources. In an exemplary embodiment, the communication channel established between the client and the access server can be a single communication channel through which all communications between the client and the access server can take place. Alternatively, a plurality of communication channels can be established between the client and the access server.

FIG. 6A illustrates an icon-based graphical user interface for requesting an application in accordance with an exemplary embodiment. The icon-based graphical user interface is provided to a user through a display 605 on a client 600. The icon-based graphical user interface includes a first icon 610 corresponding to a first application, a second icon 615 corresponding to a second application, a third icon 620 corresponding to a third application, and so on. FIG. 6B illustrates a hyperlink-based graphical user interface for requesting an application in accordance with an exemplary embodiment. The hyperlink-based graphical user interface includes a first hyperlink 625 corresponding to a first application, a second hyperlink 630 corresponding to a second application, and so on. FIG. 6C illustrates a text-based graphical user interface for requesting an application in accordance with an exemplary embodiment. The text-based graphical user interface includes a prompt 635 for specifying the type of information for the user to provide in a text entry box 640. The user can provide an application name, type, or other information in text entry box 640 to request an application. In alternative embodiments, any other type and/or form of graphical user interface can be used.

Referring back to FIG. 1, the access server determines the resources of the client in an operation 105. The resources of the client can include dynamic resources (i.e., resources which are capable of frequently changing) and static resources (i.e., resources which are not likely to change). Dynamic resources can include a currently available memory of the client, a current load on the client, a currently available bandwidth of the client, a location and/or size of any applications open on the client, etc. The access server can determine the dynamic resources of the client through a data protocol established between the client and the access server. Information can be continuously transmitted from the client to the access server while they are in communication with one another such that the access server can detect any changes in the resources of the client. In one embodiment, the access server can determine dynamic resources by installing and executing a detection application on the client. The detection application can collect resource information of the client and automatically transmit the collected information to the access server.

In an exemplary embodiment, the static resources can include the type of processor in the client, the memory capacity of the client, the network connection used by the client, the maximum bandwidth available to the client, built in components of the client such as encoders and decoders, peripheral devices connected to the client, applications installed locally on the client, etc. In an exemplary embodiment, the access server can obtain information regarding the static resources of the client from the user during the enrollment process. Alternatively, the access server can obtain static resource information through a questionnaire presented to the user or through any other method. In one embodiment, the access server can determine static resources automatically through the detection application used to determine the client's dynamic resources.

In another exemplary embodiment, the access server can receive user preferences from the client. The user preferences can include a desired budget of the user. For example, there may be a plurality of application servers which provide the same application, but at different costs. For a given application server, the cost of the application may depend on the cost of the application server equipment, the time of day at which the application is requested, the version of the application which is being provided, the current work load of the application server, the bandwidth through which the application server can provide the application, the entity which owns the application server, the security of the application server, the geographical location of the application server, the latency between the client and the application server, etc. The user can specify his/her budget based on these cost factors. As an example, a user who specifies that he/she wants to spend a minimal amount of money to receive applications may only be able to receive older versions of applications from application servers with poor security and/or low bandwidth capabilities. A user who is willing to spend more money may be able to receive high performance, up-to-date versions of applications from application servers with high security and high bandwidth. User preferences can also include a desired level of performance, a desired application version, a desired bandwidth, a desired level of security, etc. For example, the user may specify that he/she always want the most up-to-date application version at a high bandwidth regardless of the cost.

The access server can obtain the user preferences from the user during the enrollment process, during a user request, through a questionnaire, or by any other method. The user may be allowed to update and/or change his/her user preferences at any time. In one embodiment, the user may be prompted to provide at least a portion of the user preferences each time the user authenticates into the access server. In an exemplary embodiment, the access server can store and maintain the static resources of the user and/or any user preferences in a user profile corresponding to the user and/or the client. The user profile can also include contact information, billing information, authentication information, and/or personal information of the user. In one embodiment, the access server can use the user preferences to automatically provide the user with the requested application through an optimal application server. Alternatively, the user may be provided with a list of potential application servers through which the user can obtain the requested application. The list of potential application servers may include a cost of the application, a bandwidth of the application server, a version of the application, a security level of the application server, and/or any other information corresponding to the application server. The user can select an application server from the list of potential application servers which best meets his/her needs.

In an operation 110, the access server determines the resources of one or more application servers. In one embodiment, each application server may provide only a single application. Alternatively, any or all of the application servers may be capable of providing a plurality of applications. The one or more application servers whose resources are determined may be only those application servers which provide the requested application. Alternatively, the access server may determine the resources of all of the application servers with which the access server is able to communicate such that the access server can determine which application servers are able to provide the requested application.

In an exemplary embodiment, the resources of the one or more application servers can include dynamic resources and static resources. The dynamic resources can include a current work load of the application server, available memory of the application server, applications which are presently available on the application server, latency between the access server and the application server, latency between the application server and the client, and/or a number of available licenses for applications installed on the application server. A cost to use the application may also be a dynamic resource of the application server if the cost changes based on an operating state of the application server. For example, the cost may fluctuate based on whether the application server is busy, an amount of bandwidth available to the application server, properties or resources of the client, and/or properties of the user (i.e., whether the user is a college student, governmental worker, regular citizen, etc.).

In an exemplary embodiment, the access server can communicate with the one or more application servers through a network. The network can be the network through which the access server communicates with the client, or a different network depending on the embodiment. In an alternative embodiment, the access server may be incorporated within any or all of the application servers such that the access server can communicate directly with the application server(s). In an exemplary embodiment, the access server can determine the dynamic resources of an application server by installing and executing a detection application on the application server. The detection application can collect resource information of the application server and transmit the collected information to the access server.

Static resources of the application server can include the application(s) installed on the application server, the maximum memory of the application server, the type of processor in the application server, a total number of application licenses possessed by the application server, the security available through the application server, the operating system (s) with which the application server is compatible, a geographic location of the application server, a bandwidth capability of the application server, or any other information regarding the application server which is not likely to change over time. A static resource of the application server may also include a cost for the user to use installed applications if the cost does not change based on an operating state of the application server. In one embodiment, the static resources can be obtained through a setup process during which the access server obtains resource information regarding all of the application servers with which it is able to communicate. Alternatively, the static resources of the application servers can be obtained by any other method.

In an operation 115, the access server identifies an optimal application server based on the determined resources of the client, the user preferences, and/or the determined resources of the one or more application servers. In one embodiment, the access server can identify a single optimal application server for providing the requested application to the client. Alternatively, the access server may identify a plurality of optimal or potential application servers, and the user may be allowed to choose a single application server which best fulfills his/her needs. The plurality of potential application servers can be provided to the user in the form of a list which may be ranked or unranked. An order of application servers in a ranked list can be based on user preferences, resources of the application server, and/or resources of the client. In one embodiment, the access server may identify the application server based on one or more user preferences. For example, the access server may identify the application server which can provide the requested application at the lowest cost. Alternatively, the access server may identify the application server which can provide the requested application at the highest speed. In one embodiment, the access server can include a mediator application which is capable of performing any or all of the operations performed by the access server. The mediator application can be used to mediate between the client and the application servers.

In one embodiment, the user preferences can be in the form of a user ranking of criteria which are important to the user, and the access server can identify the optimal application server based at least in part on the ranked criteria. For example, the user can rank entries in a list of criteria from most important to least important such that the access server can identify the optimal application server. Alternatively, the user criteria can be identified by any other method. The criteria ranking can be performed a single time by the user such that the same criteria are evaluated each time the user requests an application. Alternatively, the user may provide a criteria ranking any time he/she requests an application. In the case of an organization, the ranking criteria may be set for the user by a system administrator based on the user's position in the organization's hierarchy, the user's importance to the organization (sales versus logistics), etc.

As an example, a user can request an application and specify that he/she wants no advertisements. The access server can locate application servers which offer the requested application without advertisements. The access server can generate a ranked list of the located application servers based on additional user criteria and/or determined resources. For example, the ranked list can be based on a cost of the requested application, availability of processor resources at the application server, availability of memory resources at the application server, availability of unique resources such as a peripheral needed for a specific application at the application server, a maximum number of users which can be supported by the application server, a current number of users using the application server, a geographical location of the application server and/or the client, latency time between the application server and the client, a version of the requested application, availability of licenses for the requested application, a security level of the premises where the application server resides, hardware of the application server, the operating system of the application server, user comments regarding the application server, the company that owns and maintains the application server, the type of billing agreement used by the application server, the reliability of the application server (i.e., backup period, redundancy, etc.), compatibility of the application server with the client, resources of the client, a status of the user, and/or any other criteria. In one embodiment, the access server can provide the ranked list to the user such that the user can select an appropriate application server. The ranked list can include any or all of the criteria used to rank the application servers such that the user is able to view the criteria and make an informed decision. Alternatively, the access server can automatically select the application server based on the user ranking of criteria and/or the determined resources.

As another example, a second user may request an application and specify that he/she is only concerned with low cost. The access server can identify application servers which offer the requested application and provide the second user with a ranked list of application servers based on cost. The second user can view the ranked list and select an application server based on cost alone, or any other information provided to the second user. For example, a first application server and a second application server may both offer the requested application for the same price. The second user can select from the first application server and second application server based on security, speed, application version, the entity which operates the application server, etc. In one embodiment, the application provided to the second user may include advertisements such that the second user receives the application at a discount price or free of charge. The advertisements can be inserted by the application server and/or the access server. In an alternative embodiment, the access server may automatically identify and select the optimal application server for providing the requested application such that a ranked list is not provided to the user.

In an operation 120, the access server provides the client with access to the application. In an exemplary embodiment, the application is provided to the access server from the identified application server, and the access server provides the application to the client through a communication channel. As such, the client may only directly interact with the access server. The communication channel can be a transmission control protocol (TCP) communication channel, a file transfer protocol (FTP) communication channel, a user datagram protocol (UDP), a real-time transport protocol (RTP), or any other type of communication channel known to those of skill in the art. Alternatively, the access server may create a communication channel between the client and the identified application server such that the identified application server can provide the application directly to the client. In an exemplary embodiment, the application can be provided to the client as a data stream, and the data stream can be based on a visible portion of the application on a display of the client. By providing data streams corresponding to only the visible portion of the application, resources of the application server, the access server, and the client can be conserved. Provision of full and partial data streams is described in more detail with reference to FIGS. 2 and 3.

In an exemplary embodiment, the identified application server can include a multi-media encoder capable of encoding a data stream corresponding to the requested application. Alternatively, the identified application server can include any other type of encoder. In one embodiment, the client can include a decoder capable of decoding the encoded data stream such that the application can be displayed on a display of the client.

In one embodiment, the access (or application) server can provide the requested application to the client as graphics commands (i.e., graphical device interface (GDI) commands, QuickDraw commands, etc.). The operating system of the client can receive the graphics commands and provide them to a display driver such that text/graphics corresponding to the commands can be rendered on a display of the client. In general, the graphics commands are specific to a particular operating system such that a graphics command corresponding to a first operating system may be unusable by a client which runs a second operating system. In addition, the use of graphics commands may not adequately support applications which include three dimensional images, video, or intensive graphics. In addition, rendering graphics on the client by receiving and processing graphics commands requires significant processing power on the client and a reliable communication channel to ensure that no data packets are lost during the transmission. Alternatively, the access (or application) server can provide the requested application as a data stream through protocols such as Citrix's (of Ft. Lauderdale, Fla.) Independent Computing Architecture (ICA), Microsoft's (of Redmond, Wash.) Remote Desktop Protocol (RDP), etc.

As an alternative to providing the client with graphics commands, the access (or application) server can render a display of the application, capture the rendered display as a video stream, compress the rendered display using MPEG4, H.264, or any other compression algorithm, and stream the rendered display to the client. As such, the client does not need to have a powerful processor capable of processing graphics commands, a rapid communication channel can be used because lost data packets can be replaced as known to those skilled in the art, and any kind of application (i.e., video, graphics intensive applications, etc.) can be provided to the client. In addition, the client can receive the streamed application regardless of its operating system. In one embodiment, the application server can generate the application data stream and stream it directly to the client. Alternatively, the application server can generate the application data stream and stream it to the access server, and the access server can stream the application data stream to the client. In an alternative embodiment, the application server can provide graphics commands to the access server, the access server can use the graphics commands to generate the application data stream, and the access server can provide the generated application data stream to the client. In an exemplary embodiment, the client can receive the application data stream, decode the received application data stream, and display an application window without performing any graphical processing. Alternatively, the access (or application) server can provide the requested applications in any other form known to those of skill in the art.

In an exemplary embodiment, the user may be able to request any number of applications. For example, in addition to a first application, the user may also request a second application, a third application, a fourth application, etc. In one embodiment, the user may be able to simultaneously submit requests for a plurality of applications. Alternatively, the user may only be allowed to submit one request at a time. The access server can repeat any or all of the operations described with reference to FIG. 1 to identify optimal servers for the second application, the third application, etc. In one embodiment, the access server may include multi-threaded software such that the access server can simultaneously identify a plurality of optimal servers corresponding to a plurality of requested applications. Alternatively, the access server can serially identify optimal servers. In an exemplary embodiment, a single identified application server may be an optimal application server for providing a plurality of requested applications to the client. For example, a first application server may be identified for providing a first requested application and a second requested application to the client, and a second application server may be identified for providing a third requested application to the client.

In an exemplary embodiment, the access server can provide a plurality of applications to the client through a single communication channel. This can be advantageous for clients which are incapable of maintaining a plurality of communication channels. The single communication channel can be between the client and the access server, and the access server can maintain a plurality of communication channels with the identified application servers which are providing the applications. Alternatively, the access server can open a communication channel between the access server and the client for each application which is being provided to the client. In another alternative embodiment, the client may receive the requested applications directly through one or more communication channels between the client and the identified application servers.

Figure 2:
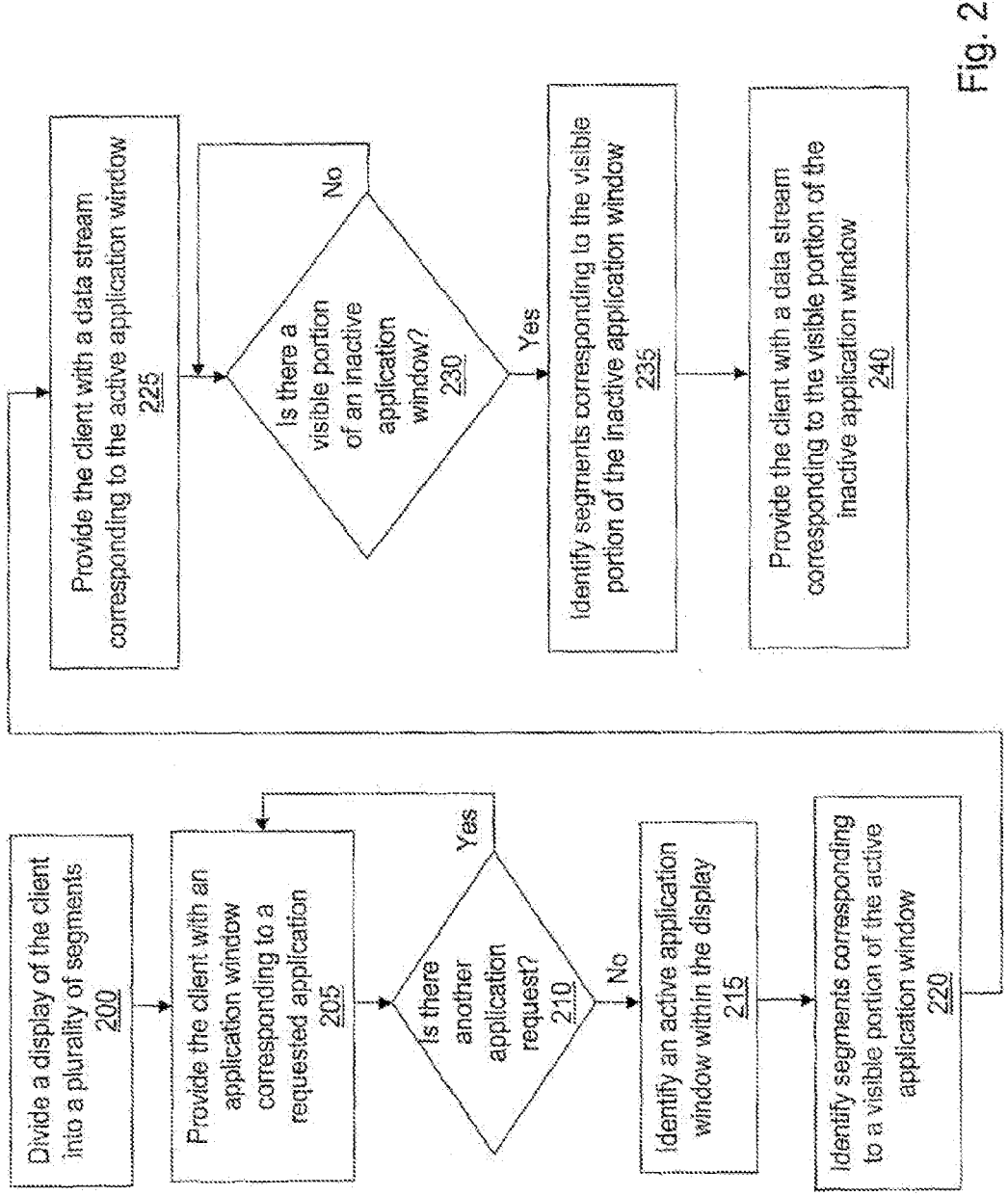
FIG. 2 is a flow diagram illustrating operations performed by the access server to optimize resource allocation in accordance with an exemplary embodiment.

FIG. 2 is a flow diagram illustrating operations performed by the access server to optimize resource allocation in accordance with an exemplary embodiment. Additional, fewer, or different operations may be performed in alternative embodiments. In an exemplary embodiment, resource allocation can be optimized by limiting the amount of data which is provided to the client. For example, the access server may only provide the client with data corresponding to an active (or topmost) application on a display of the client. When the active (or topmost) application changes from a first application to a second application, the data provided to the client can change accordingly. Alternatively, the data provided to the client may include data corresponding to the active application and data corresponding to any visible portions of non-active applications.

In an operation 200, the access server divides a display of the client into a plurality of segments. The client display can be a liquid crystal display (LCD), a thin film transistor (TFT) display, a cathode ray tube (CRT) display, or any other type of display known to those of skill in the art. In an exemplary embodiment, the plurality of segments can correspond to a plurality of pixels. For example, a first segment can correspond to a first pixel of the display, a second segment can correspond to a second pixel of the display, and so on. Alternatively, a first segment can correspond to a first group of four pixels, a second segment can correspond to a second group of four pixels, a third segment can correspond to a group of eight pixels, etc. In an alternative embodiment, a segment can correspond to any other portion of the display. In an exemplary embodiment, the access server can determine a display size and/or resolution of the client through the detection application described with reference to FIG. 1. Alternatively, the user can manually provide the display size and/or resolution.

In an operation 205, the access server provides the client with an application window corresponding to a requested application. In an exemplary embodiment, applications can be directly or indirectly provided to the client through an identified optimal application server according to the operations described with reference to FIG. 1. The access server can request the requested application from the application server, and the application server can open the application locally on a dedicated display. The dedicated display may be virtual (i.e., only in the memory of the application server) or actual, depending on the embodiment. As the client manipulates the application, the dedicated display can include the same content as and can be adjusted to the same size as the application window on the client. The application server can directly or indirectly stream the application to the client. Alternatively, applications can be requested by and/or provided to the client by any other method. The application window can be any window (or screen) through which the user can interact with the requested application. In an exemplary embodiment, the application window can be minimized, maximized, resized, moved around the display, closed, etc. by the user.

In an exemplary embodiment, the user can request access to multiple applications. In an operation 210, the access server determines whether there is another application request from the client. If there is another application request, the access server can provide the client with another application window corresponding to the requested application in operation 205. As an example, the client can be provided with a first application window corresponding to a first requested application, a second application window corresponding to a second requested application, and a third application window corresponding to a third requested application. In an exemplary embodiment, the user can request additional applications at any time.

In an operation 215, the access server identifies an active application window within the display. The active application window can refer to the topmost application window on the display of the client. In general, the topmost application window can refer to the application window in which the user has most recently performed an action. For example, if the user maximizes, moves, mouse clicks within, types within, or otherwise performs an action in an application window, that application window can be the topmost (and active) application window. The active application window can remain the active application window until it is minimized or closed by the user, or until the user maximizes, moves, mouse clicks within, types within, or otherwise performs an action in a different application window. In an exemplary embodiment, if the user takes no action subsequent to receiving the application window(s), the active application window can be the application window that was last provided to the user. The active application window can also refer to any application window which receives inputs from the user.

As an example, the access server may provide the client with three application windows corresponding to three applications. A first application window can correspond to an email application, a second application window can correspond to a word processing application, and a third application window can correspond to a spreadsheet application. If the user is typing within the word processing application, the second application window can be the active application window. If the user finishes typing within the word processing application and mouse clicks within the spreadsheet application, the third application window can become the active application window. Similarly, if the user minimizes the spreadsheet application and begins typing an email, the first application window can become the active application window.

In an operation 220, the access server identifies segments corresponding to a visible portion of the active application window. The visible portion of the active application window can refer to the portion of the active application window which the user is able to see on the display. The segments corresponding to the visible portion of the active application window can depend on the location of the active application window within the display of the client and the size of the active application window. As such, an active application window which is sized such that it fits within one quarter of the display can take up less segments than an application window which is sized such that it fits one half of the display. Similarly, an active application window which is partly outside of a display boundary (and thus not visible to the user) can take up less segments than an active application window of the same size which is fully within the display. As an example, the display may include 786,432 pixels, and the active application window may be sized to exactly cover an upper half of the display. The access server can identify the uppermost 393,216 pixels as the segments corresponding to the visible portion of the active application window.

In an exemplary embodiment, the display can be represented as a matrix based on the number of pixels of the display. In the case of a client which includes multiple displays, the matrix can correspond to the total size of the combined displays. As an example, a display with 1024×768 resolution can have 786,432 pixels. A matrix corresponding to the display can be generated and maintained by the access server, and can include 786,432 entries, where each entry corresponds to a location within the display. As described in more detail below, each matrix entry can include information regarding which (if any) application should be displayed at the pixel corresponding to the entry. The matrix can be generated and maintained by the access server based on information provided to the access server by the client. In an alternative embodiment, any other data structure can be used to maintain display information.

In an operation 225, the access server provides the client with a data stream corresponding to the active application window. The data stream can allow the user to fully view and interact with the active application window. In one embodiment, the data stream can correspond to only the visible portion of the active application window. Alternatively, the data stream can correspond to the entire active application window regardless of whether a portion of the active application window is not visible to the user. In an exemplary embodiment, the access (or application) server can use the matrix to determine the display location at which the active application window should be placed. The data stream can be periodically updated such that the user can view the results of his/her interaction with the application. For example, if the user types a word within the active application window, the data stream can be updated such that the active application window illustrates the typed word. Similarly, if the user resizes the active application window, scrolls within the active application window, opens a menu within the active application window, deletes text from the active application window, etc., the access server can update the data stream to reflect the changes.

In an exemplary embodiment, the access server can receive a data stream from the application server corresponding to an application window, and can route the received data stream to the client. Similarly, actions performed by the user can be transmitted from the client to the access server and from the access server to the application server. Actions performed by the user can include typing within an application, resizing an application window, opening an options menu of the application, etc. In an alternative embodiment, the application server can provide the data stream directly to the client and the application server can receive user actions directly from the client. In such an embodiment, the access server can manage a communication channel between the application server and the client. The access server may provide the application server with an identification of the client such that the application server can establish the communication channel. The identification of the client can be an IP address or any other information which can be used to distinguish the client. Alternatively, the access server can establish the communication channel. In one embodiment, the data stream can be transmitted by the application server directly to the client, and user actions (or inputs) can be provided from the client to the application server indirectly through the access server.

In an operation 230, the access server can determine whether there is a visible portion of an inactive application window. An inactive application window can refer to any application window which is not the topmost (or active) application window. The visible portion of the inactive application window can refer to any portion of the inactive application window which the user is able to view in addition to the active application window. For example, if the inactive application window is aligned side-by-side with the active application window and with no overlap, the entire inactive application window can be visible to the user. Similarly, if an upper right one quarter of a first inactive application window is covered by the active application window and an upper left one quarter of the first inactive application window is covered by a second inactive application window, a bottom one half of the first inactive application window can be visible. Alternatively, any or all of the bottom one half of the first inactive application window may be below the display boundary and not visible to the user.

In an exemplary embodiment, operation 230 can be repeated on a periodic basis such that the access server can determine whether a change occurs which results in a visible portion of an inactive application window. If the access server identifies a visible portion of an inactive application window, the access server can determine the segments corresponding to the visible portion of the inactive application window in an operation 235. In an exemplary embodiment, the segments (pixels) corresponding to the visible portion of the inactive application window can be identified using the matrix of pixels.

In an operation 240, the access server provides the client with a data stream corresponding to the visible portion of the inactive application window. As a result, data corresponding to portions of the inactive window which are not visible are not provided to the client and the overall data stream size is reduced. This reduced data stream size can reduce the amount bandwidth used during data transmission, lessen the workload of the application server, and lessen the workload of the client. In an exemplary embodiment, the access server can provide the application server with the matrix, the application server can provide the access server with the data stream corresponding to the visible portion of the inactive application window, and the access server can provide that data stream to the client. Alternatively, the application server may provide the access server with a data stream from which the access server can use the matrix to extract the data stream corresponding to the visible portion of the inactive application window. The access server can provide the extracted data stream to the client. Regardless of whether the data stream is provided by the application server or the access server, the data stream can be streamed to the proper location in the display based on the matrix. In one embodiment, the access server can update the application window(s) periodically. The period can be thirty milliseconds, or any other amount of time. Alternatively, the access server can update the application window(s) every time there is a change in the content of an application window, every time an application window is opened, closed, moved, resized, etc., based on a user request for a refresh, or based on any other criteria. In one embodiment, the data stream may be provided to the client only when there is a change in the display which directly or indirectly affects the application window. In an exemplary embodiment, the application windows can be displayed on the client through a desktop application located at the access server. The access servers and/or application servers can send/receive information through the desktop application.

In some instances, a user may move an application window in a display without altering a visible portion of the application window. In an exemplary, embodiment, the matrix can be adjusted to reflect the movement, and the same data stream can be streamed to the client at the new location. As such, resources are conserved because the access (or application) server does not have to re-render, re-capture, re-encode, etc. the application window each time the application window is moved. Resources are further conserved at the application server because a virtual display can be sized relative to the application window and not relative to the entire display of the client. Virtual displays of the application server are described in detail with reference to FIG. 7.

In some instances, portions of inactive application windows which are not covered by the active application window may overlap. In such instances, the access server can determine a display priority of the application windows such that a first inactive application window can have priority over a second inactive application window, an active application window can have priority over an inactive application window, and so on. The display priority can be based on the recentness in which the inactive application window was the active application window. As an example, a first application window can be provided to the client and can be the active application window. The user can request a second application window, and the second application window can be provided to the client such that the second application window partially overlaps the first application window. The second application window can be the active application window. The user can request a third application window, and the third application window can be provided to the client such that the third application window partially overlaps the first application window and the second application window. Assuming the user performed no actions in the application windows, the second (inactive) application window can be ranked higher than the first (inactive) application window because the second application window was the active application window more recently than the first application window. As such, if the third (active) application window is closed or minimized, the second application window can become the active application window for display purposes.

As another example, the access server can provide the client with five requested applications (AP1-AP5). The display priority of the applications from highest to lowest can be AP4 (currently active application), AP3 (inactive application which was the active application prior to AP4), AP5 (inactive application which was the active application prior to AP3), AP1 (inactive application which was the active application prior to AP5), and AP2 (inactive application which was the active application prior to AP1). The access server can maintain the display priority information and provide it to the application server(s) such that the application server(s) can determine an appropriate data stream for each application as the applications are manipulated by the user.

In one embodiment, the access server and/or the application server can use alpha compositing to combine application windows such that one or more overlapping application windows exhibit partial transparency. For example, when a first application window is on top of a second application window, an alpha variable can be created and used to determine a ratio of transparency between the first application window and the second application window. The ratio of transparency can be any ratio such that the overlapped portion of the second application window is at least partially visible. In one embodiment, an alpha value can be created for each pixel in a display of the client. Alternatively, alpha values may be created only for pixels corresponding to locations of overlapping windows. The alpha values can be included in the matrix of pixels or any other data structure such that an access server and/or an application server can provide the client with pixels exhibiting at least partial transparency.

In an embodiment in which application data streams are provided directly from application servers to clients, each application server can receive alpha values and use the alpha values to determine appropriate pixel values to be contributed to the client such that, when combined, transparency exhibiting pixels are obtained. The data streams can be sent to the client (from one or more application servers), and the client can combine the received pixel values to obtain the pixels which exhibit transparency. Alternatively, if a single application server is providing the client with a plurality of data streams, the single application server can combine the pixel values from the plurality of data streams to obtain the transparency exhibiting pixels such that they can be provided to the client. If the data streams are provided to the client through an access server, the access server can receive a plurality of data streams from one or more application servers. The access server can use the alpha values to determine appropriate pixels corresponding to each data stream. The access server can combine the appropriate pixels to generate the transparency exhibiting pixels and provide the transparency exhibiting pixels to the client. Alternatively, the access server can provide the appropriate pixels to the client and the client can combine them to obtain the transparency exhibiting pixels. In an alternative embodiment, the access server can provide the application server(s) with the alpha values such that the application server(s) can determine appropriate pixels corresponding to the data streams. The access server can receive the appropriate pixels from the application server(s), combine the appropriate pixels to generate the transparency exhibiting pixels, and provide the transparency exhibiting pixels to the client.

Depending on the applications provided to a client, one or more application windows on a display of the client may include audio content. In one embodiment, only audio content corresponding to the active application window may be provided to the client. Alternatively, audio content corresponding to all of the application windows on the display may be provided to the client. In one embodiment, a user of the client can select the application window(s) from which he/she wishes to receive audio content. For example, the user can be provided with a list of application windows from the access server. The user can select an audio preference to enable and/or disable audio content from any of the application windows. The ability to disable audio from an application window can conserve resources by further reducing the size and complexity of the data streams which are generated (by an application server and/or an access server), sent (by the application server and/or the access server), and received (by the client).

Figure 3:
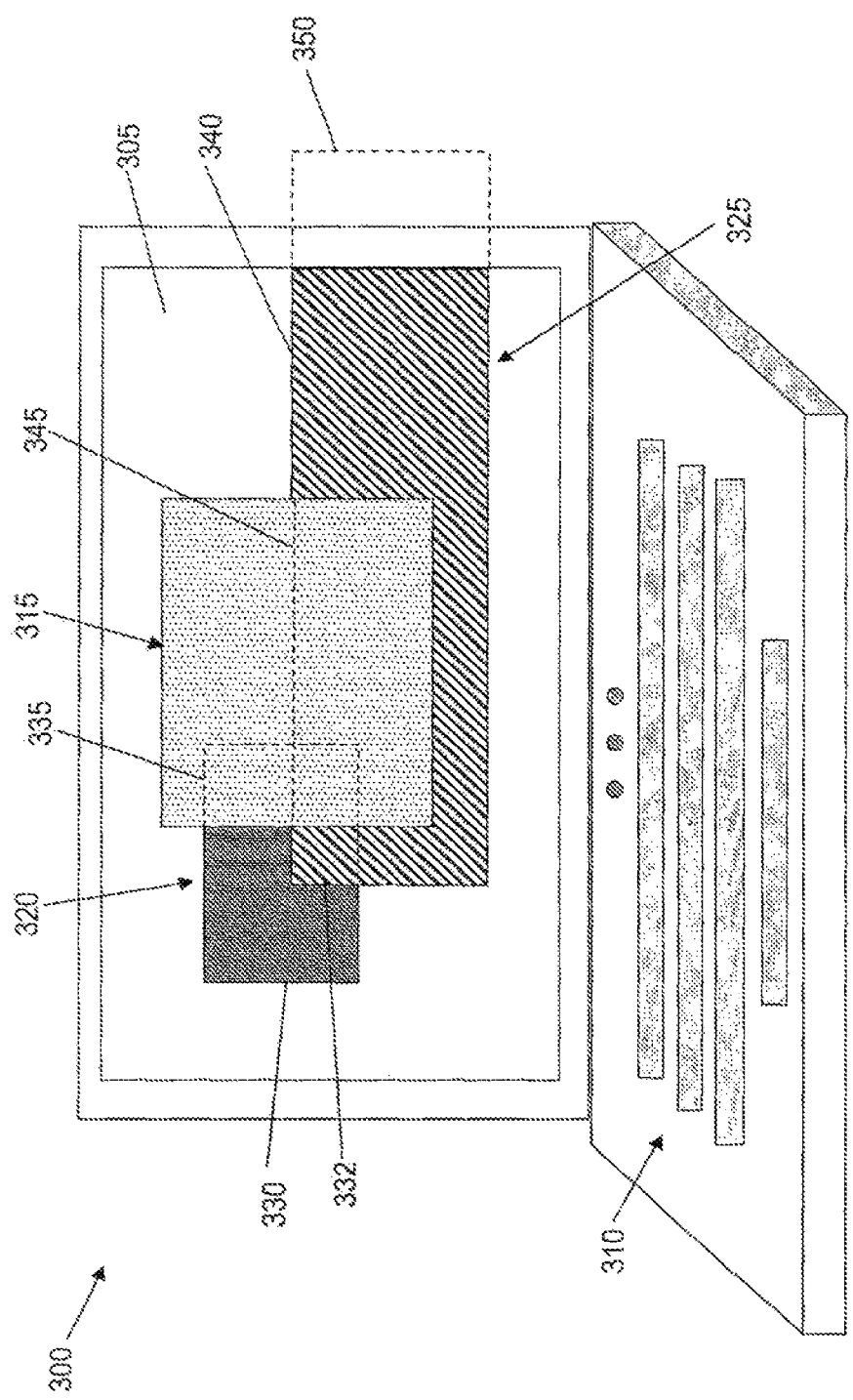
FIG. 3 is a diagram illustrating a plurality of application windows on a client in accordance with an exemplary embodiment.

FIG. 3 is a diagram illustrating a plurality of application windows on a client 300 in accordance with an exemplary embodiment. Client 300 can be a laptop computer which includes a display 305 and an input mechanism 310. Input mechanism 310 can be a keyboard, and a user of client 300 can interact with client 300 by entering commands through the keyboard. Alternatively, input mechanism 310 can be a mouse, a touch screen, a touch pad, a microphone, or any other mechanism through which the user can interact with client 300. Display 305 can be any type of display or monitor known to those of skill in the art.

Display 305 includes a first application window 315, a second application window 320, and a third application window 325. In an exemplary embodiment, first application window 315 can be an active application window in which the user is currently working, and application window 320 and application window 325 can be inactive application windows. The access server described with reference to FIGS. 1 and 2 identify can identify the segments (i.e., pixels) of display 305 which correspond to a visible portion of first application window 315. As illustrated, the entire first application window 315 is within the boundaries of display 305 and is thus visible to the user. As such, the access server can provide a data stream corresponding to first application window 315 such that first application window 315 is fully visible and fully interactive.

First application window 315 overlaps second application window 320 such that second application window 320 includes a visible portion 330 and a first non-visible portion 335 represented by dashed lines. Second application window 320 also includes a second non-visible portion 332 due to an overlap by third application window 325. In an exemplary embodiment, third application window 325 has a higher display priority than second application window 320. As a result, third application window 325 can be displayed in any portion of display 305 not covered by first application window 315 and in which third application window 325 and second application window 320 overlap. The access server can identify the segments of display 305 which correspond to visible portion 330 of second application window 320, and provide client 300 with a data stream corresponding to visible portion 330. As such, the user is able to view visible portion 330 of second application window 320 while he/she is working within or viewing first application window 315. Further, because client 300 is being provided with a reduced size data stream, client 300 has more resources to devote to the application within first application window 315 and/or any other local applications which client 300 is running.

Third application window 325 has a visible portion 340, a first non-visible portion 345 represented by a dashed line, and a second non-visible portion 350 represented by dashed lines. First non-visible portion 345 is covered by first application window 315, and second non-visible portion 350 is outside the boundary of display 305. In an exemplary embodiment, the access server can provide client 300 with a data stream corresponding to only visible portion 340 by identifying the segments of display 305 which correspond to visible portion 340. Alternatively, the access server may provide client 300 with a data stream corresponding only to visible portion 340 and non-visible portion 350. In another alternative embodiment, the access server may provide client 300 with a data stream corresponding only to visible portion 340 and non-visible portion 345.

As described with reference to FIG. 2, the access server can periodically check whether the active status, inactive status, visible portion(s) and/or non-visible portion(s) of any of the application windows are changed by the user. The period(s) can be any amount of time, including ten microseconds, one millisecond, thirty milliseconds, etc. As an example, the user may use a mouse (not shown) to click within second application window 320 and move second application window 320 to the left such that first application window 315 and second application window 320 no longer overlap. When the user clicks within second application window 320, second application window 320 can become the (topmost) active application window and the access server can provide client 300 with a data stream corresponding to second application window 320. If, after moving second application window 320, the user begins typing within first application window 315, first application window 315 can again be the active application window. However, second application window 320 can now have a higher display priority than third application window 325 such that second application window 320 can be displayed in any areas in which second application window 320 and third application window 325 overlap. The access server can identify segments corresponding to a new visible portion of second application window 320 and provide client 300 with a data stream corresponding to the new visible portion. If second application window 320 is within the boundary of display 305, the new visible portion can be the entire second application window 320. Similarly, the access server can alter the data streams provided to client 300 any time the user resizes an application window, minimizes an application window, closes an application window, opens or uses a local application, or otherwise changes the active and/or visible status of the application windows.

In an exemplary embodiment, when a requested application is initially provided to the user, the access server (or application server) can determine a size of the application window and location on the display where the application window is to be placed, and adjust the matrix of pixels accordingly. Alternatively, the initial application window size and location can be determined by the client, based on user preferences, or by any other method. In an exemplary embodiment, the newly provided application can be the active application until the user performs an action in a previously provided application window. Alternatively, the newly provided application window may remain an inactive application window until the user performs an action in the newly provided application window. The newly provided application can be included in the matrix based on its size, location, and status as inactive or active. As the user requests additional applications, moves existing application windows, refocuses existing application windows, resizes existing application windows, closes existing application windows, etc., the matrix which includes positional and display information can be updated accordingly by the access server.

Figure 7:
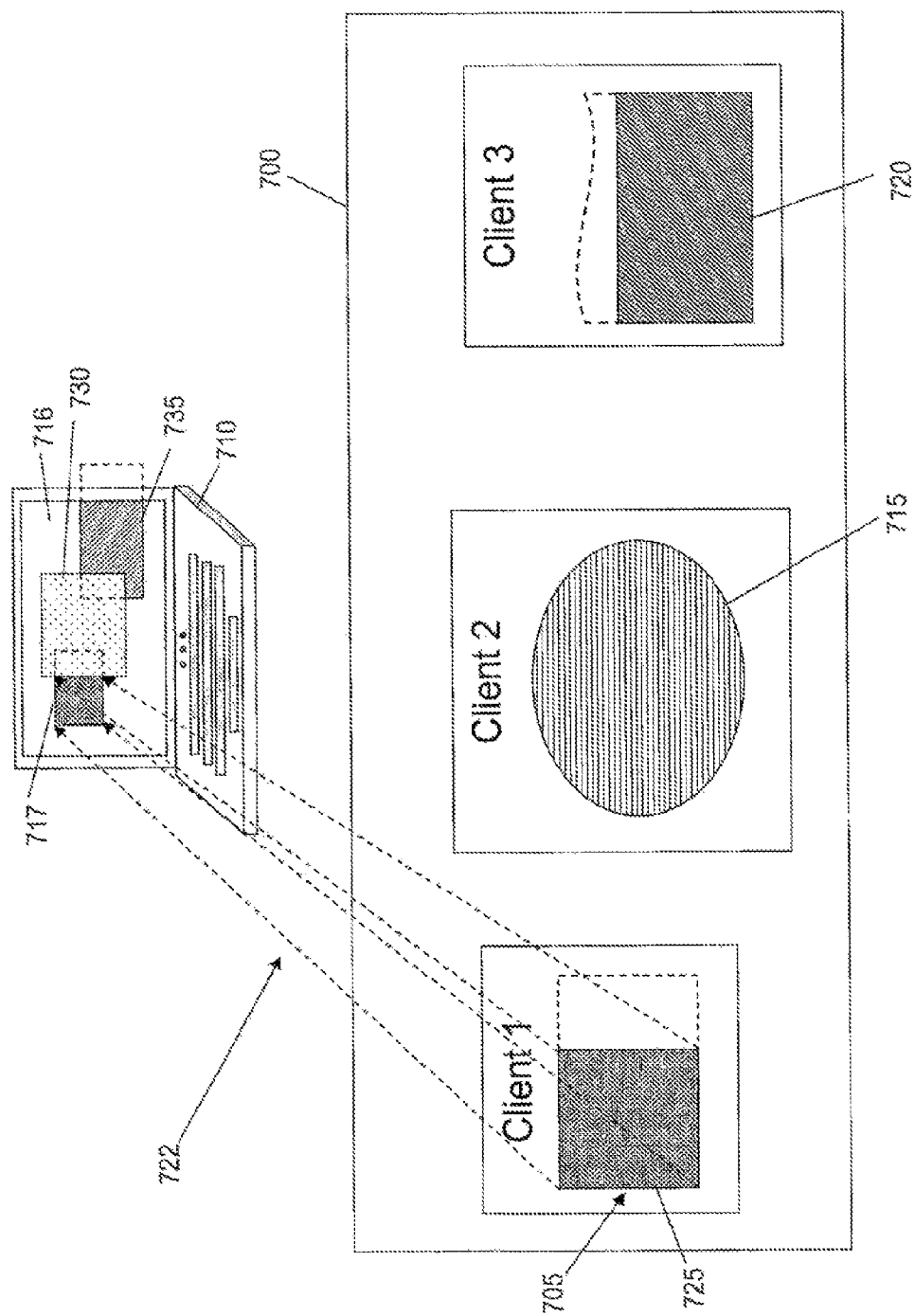
FIG. 7 illustrates a display of an application server in accordance with an exemplary embodiment.

In an exemplary embodiment, the application server can use the matrix generated by the access server to provide the requested application(s) to the client. As described above, the application server can maintain application windows corresponding to the applications which it is providing to clients. FIG. 7 illustrates a display of an application server 700 in accordance with an exemplary embodiment. The display can be a virtual display which is contained in memory of application server 700, and which is shown for illustrative purposes. Alternatively, the display can be an actual display. As depicted, application server 700 is providing a first application window 705 to a first client 710, a second application window 715 to a second client (not shown), and a third application window 720 to a third client (not shown). In an exemplary embodiment, an access server can provide application server 700 with a matrix (or other data structure) that conveys which portion of the application windows are visible and/or a location of the application windows on the client displays.

With reference to first application window 705, the matrix can convey that a visible portion 725 of first application window 705 is located at a first position 717 on a display 716 of first client 710. Application server 700 can use the matrix to transmit a data stream 722 corresponding to only visible portion 725 of first application window 705 to first client 710. Data stream 722 can include positional information such that the application window is streamed to first position 717. In an exemplary embodiment, in cases where an application window is moved without altering the visible portion of the application window, only the positional information of the data stream may change such that resources are not expended to re-render, re-capture, re-encode, etc. the application window. The transmission to first client 710 can be direct or indirect (i.e., through the access server). As a result, application server 700 is able to conserve resources with respect to rendering, capturing, compressing, encoding, and/or streaming first application window 705.

In an exemplary embodiment, application server 700 can maintain the entire first application window 705 even though only a portion thereof is being transmitted. In one embodiment, the matrix can provide application server 700 with the precise location of visible portion 725 of first application window 705 such that application server 700 can stream visible portion 725 to the correct location on the display of first client 710. As such, application server 700 can provide data stream 722 directly to first client 710, thereby reducing any latency introduced through use of the access server as a mediator.

Client 710 also includes a second application window 730 and a third application window 735. In an exemplary embodiment, a second application server (not shown) can use the matrix and provide client 710 with a data stream corresponding second application window 730. Similarly, a third application server (not shown) can use the matrix and provide client 710 with a data stream corresponding to the visible portion of third application window 735. In one embodiment, the second and third application servers can provide second application window 730 and third application window 735 directly to client 710. Alternatively, application server 700, the second application server, and the third application server can provide data streams to the access server, and the access server can provide all three application windows to client 710 through a single communication channel.

Figure 4:
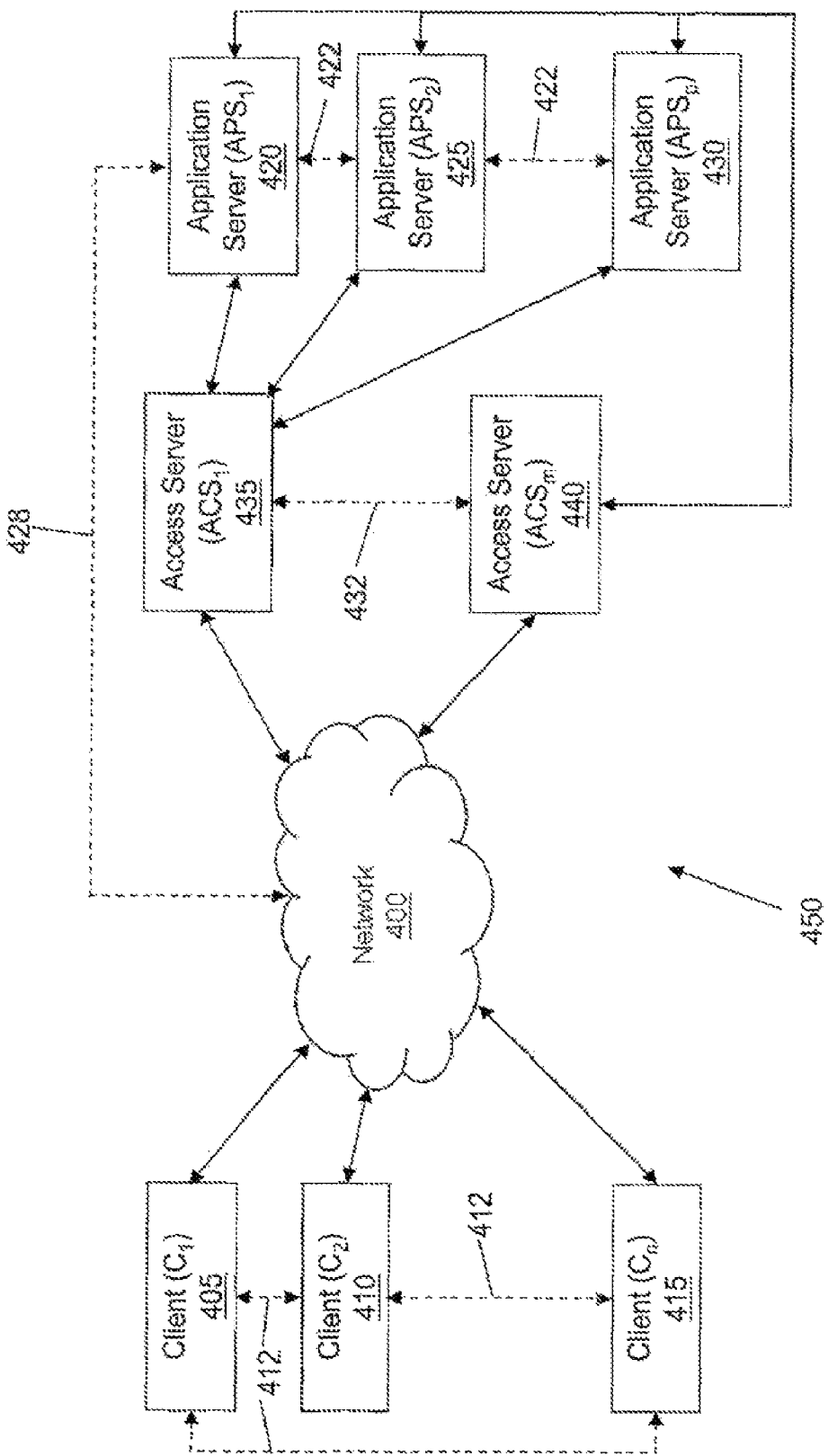
FIG. 4 is a block diagram illustrating a server based computing system in accordance with an exemplary embodiment

FIG. 4 is a block diagram illustrating a server based computing system (or system) 450 in accordance with an exemplary embodiment. Additional, fewer, or different blocks may be included in alternative embodiments. System 450 includes a client ($C_1$) 405, a client ($C_2$) 410, and a client ($C_n$) 415. In an exemplary embodiment, n, which can be any value, can be the number of clients in communication with system 450. Client ($C_1$) 405, client ($C_2$) 410, and client ($C_n$) 415 can be any type of network accessible user device known to those of skill in the art, including a desktop computer, a laptop computer, a personal digital assistant, a portable gaming unit, a wired gaming unit, a cellular telephone, a thin client, a set-top box, a portable multi-media player, etc.

In an exemplary embodiment, client ($C_1$) 405, client ($C_2$) 410, and client ($C_n$) 415 are in communication with a network 400. Network 400 can be a wide area network (WAN) such as the Internet, a local area network (LAN) such as an Ethernet, a telecommunications network, or any other medium through which clients can send and/or receive data. Client ($C_1$) 405, client ($C_2$) 410, and client ($C_n$) 415 can access and communicate across network 400 through a wireless communications card, a cable line, a telephone line, or by any other method known to those of skill in the art. In addition, dashed lines 412 are used to indicate that any or all of client ($C_1$) 405, client ($C_2$) 410, and client ($C_n$) 415 can be in communication with each other. Client communication can occur through network 400, or through a different network depending on the embodiment.

In one embodiment, inter-client communication can include voice over Internet protocol (VoIP) communication. In one embodiment, a VoIP session can be implemented through one or more access servers in communication with the clients participating in the VoIP session. The one or more access servers can maintain identification information (i.e., IP address, etc.) of participating clients, establish and maintain connections between the clients, and route communications among the clients. Alternatively, one or more application servers, alone or in conjunction with one or more access servers, can be used to maintain identification information, establish/maintain connections, and/or route communications among clients participating in a VoIP session.

FIG. 5A is a block diagram illustrating a client 500 in accordance with an exemplary embodiment. Client 500 includes a central processing unit (CPU) 505, a memory 510, a data input mechanism 515, a data output mechanism 520, a network interface 525, an encoder 530, and a decoder 535. In alternative embodiments, client 200 can include additional, fewer, or different components. Central processing unit (CPU) 505 can be any programmable logic device capable of performing all of the instruction, logic, and mathematical processing in client 500. Memory 510 can be coupled to CPU 505, and can be capable of storing data on client 500. Data input mechanism 515 can be a keyboard, mouse, touch pad, touch screen, joystick, remote control, microphone, web camera, or any other mechanism which allows a user of client 500 to input data. Data output mechanism 520 can be a computer monitor, speaker, liquid crystal display screen, printer, or any other mechanism which allows the user to experience audio and/or visual data through client 500. Network interface 525 can be a wireless communication card, an antenna, a cable, a telephone line, or any other conduit by which client 500 can access and communicate across network 400 described with reference to FIG. 4. Encoder 530 can be any software or hardware capable of compressing, encrypting, authenticating, and/or streaming data which is to be sent from client 500 to a destination. Decoder 535 can be any software or hardware capable of decompressing, decrypting, and/or authenticating received encoded data such that client 500 can utilize the received data. In an exemplary embodiment, encoder 530 and/or decoder 535 can be executed by CPU 505 and stored in memory 510.

Referring back to FIG. 4, system 450 also includes an application server ($APS_1$) 420, an application server ($APS_2$) 425, and an application server ($APS_p$) 430. In an exemplary embodiment, p, which can be any value, can be the number of applications servers within system 450. FIG. 5B is a block diagram illustrating an application server 540 in accordance with an exemplary embodiment. Application server 540 includes a network interface 545, a memory 550, a central processing unit (CPU) 555, an encoder 560, input/output (I/O) ports 565, and a decoder 567.

Network interface 545 can be a wireless communication card, an antenna, a cable, a telephone line, or any other conduit by which application server 540 can access and communicate across network 400 described with reference to FIG. 4. Central processing unit (CPU) 555 can be any programmable logic device capable of performing all of the instruction, logic, and mathematical processing in application server 540. Memory 550 can be coupled to CPU 555, and can be capable of storing data on application server 540. The data stored in memory 550 can include user documents, application files, application add-ons, or any other application or server related data. Encoder 560 can be any software or hardware capable of compressing, encrypting, authenticating, and/or streaming data streams from application server 540 to a destination such as an access server or a client. Input/output ports 565 can be used by CPU 555 to send and receive data.

Application server 540 also includes decoder 567 which may be used for transcoding one data stream to another. As an example, application server 540 may be used to provide a video from a website to a client through a network browser. Application server 540 can open the network browser for provision to a user, and the user can enter a uniform resource locator (URL) into the network browser corresponding to the website. Application server 540 can obtain the video from the website and use decoder 567 to transcode the video to an appropriate protocol such that the client can receive the video. Alternatively, decoder 567 can be used for any other decoding as known to those skilled in the art. In alternative embodiments, application server 540 can include additional, fewer, or different components.

Referring back to FIG. 4, any or all of application server ($APS_1$) 420, application server ($APS_2$) 425, and application server ($APS_p$) 430 can be servers which are dedicated to a single application. For example, application server ($APS_1$) 420 can be dedicated to a word processing application and application server ($APS_2$) 425 can be dedicated to a spreadsheet application. Alternatively, any or all of the application servers can include a plurality of applications. For example, application server ($APS_1$) 420 can include a word processing application, a spreadsheet application, an email application, and a file management application. In another exemplary embodiment, the application servers can each be dedicated to a single operating system. For example, application server ($APS_1$) 420 can include a spreadsheet application for a Linux operating system, application server ($APS_2$) 425 can include the spreadsheet application for a Windows operating system, an application server ($APS_3$) (not shown) can include a word processing application for the Linux operating system, and an application server ($APS_4$) (not shown) can include the word processing application for the Windows operating system. Alternatively, any or all of the application servers can include applications which are compatible with a plurality of operating systems. For example, application server ($APS_1$) 420 may include a Linux operating system version of a spreadsheet application, a Unix operating system version of the spreadsheet application, a Macintosh operating system version of the spreadsheet application, and a Windows operating system version of the spreadsheet application. Similarly, application server ($APS_2$) 425 may include a Linux operating system version of a word processing application, a Unix operating system version of the word processing application, a Macintosh operating system version of the word processing application, a Windows operating system version of the word processing application, a Linux operating system version of an email application, a Unix operating system version of the email application, a Macintosh operating system version of the email application, and a Windows operating system version of the email application.

In an alternative embodiment, any of application server ($APS_1$) 420, application server ($APS_2$) 425, and application server ($APS_p$) 430 can be used for data storage. For example, application server ($APS_1$) 420 may include a word processing application, and application server ($APS_2$) 425 may be used to store toolboxes corresponding to the word processing application, other additional files corresponding to the word processing application, saved documents of users of the word processing application, etc. Application server ($APS_1$) 420 can communicate with application server ($APS_2$) through network 400 or any other network. In an exemplary embodiment, any of the application servers can communicate with any of the other application servers as indicated by dashed lines 422.

In one embodiment, one or more application servers can store user information such as a user profile, personal information, billing information, user files, and/or user preferences. The access server can be used to coordinate the storage and inform other application servers where to find user information. As an example, a user may be working with three applications provided by three different application servers. The access server can inform each of the three application servers that the user's information is stored on a fourth application server. The first, second, and third application servers can communicate with the fourth application server to access user files, save user files, bill the user, etc. Alternatively, the user information may be stored on the fourth application server and a fifth application server. The first, second, and third application servers can communicate with the fourth and fifth application servers to obtain user information.

In an exemplary embodiment, any or all of application server ($APS_1$) 420, application server ($APS_2$) 425, and application server ($APS_p$) 430 can be used to provide a user with remote access to one or more applications. In another exemplary embodiment, the applications can be provided through one or more access servers. System 450 includes an access server ($ACS_1$) 435 and an access server ($ACS_m$) 440, where m, which can be any value, can be the number of access servers within system 450. In an exemplary embodiment, access server ($ACS_1$) 435 and/or access server ($ACS_m$) 440 can request and receive application data streams from any of application server ($APS_1$) 420, application server ($APS_2$) 425, and application server ($APS_p$) 430. Access server ($ACS_1$) 435 and/or access server ($ACS_m$) 440 can provide the received data streams to any of client ($C_1$) 405, client ($C_2$) 410, and client ($C_n$) 415.

In an exemplary embodiment, any or all of all of application server ($APS_1$) 420, application server ($APS_2$) 425, and application server ($APS_p$) 430 can communicate with a plurality of access servers. For example, application server ($APS_1$) 420 can communicate with access server ($ACS_1$) 435 to provide a first application to client ($C_1$) 405 and access server ($ACS_m$) 440 to provide a second application to client ($C_2$) 410. The first application and the second application can be the same or different applications depending on the embodiment. Alternatively, application server ($APS_1$) 420 can communicate with access server ($ACS_1$) 435 to provide a first application to client ($C_1$) 405 and access server ($ACS_1$) 435 to provide a second application to client ($C_2$) 410.

As an example, a user of client ($C_1$) 405 can authenticate into system 450 through access server ($ACS_1$) 435 and request a first application. Access server ($ACS_1$) 435 can identify application server ($APS_1$) 420 as the optimal application server for providing the first requested application as described with reference to FIG. 1. Access server ($ACS_1$) 435 can request the first application from application server ($APS_1$) 420 and application server ($APS_1$) 420 can provide access server ($ACS_1$) 435 with a data stream corresponding to the first application. Access server ($ACS_1$) 435 can provide the first application data stream to client ($C_1$) 405 through a communication channel, and client ($C_1$) 405 can display the application for the user. If the user requests a second application, access server ($ACS_1$) 435 can identify application server ($APS_2$) 425 as the optimal application server for providing the second requested application. Access server ($ACS_1$) 435 can request the second application from application server ($APS_2$) 425, receive a second data stream corresponding to the second application, and provide the second data stream to client ($C_1$) 405 through the same communication channel. Alternatively, a different communication channel can be used. In another alternative embodiment, access server ($ACS_1$) 435 can establish a first communication channel between application server ($APS_1$) 420 and client ($C_1$) 405 such that the first data stream can be provided to client ($C_1$) 405, and a second communication channel between application server ($APS_2$) 425 and client ($C_1$) 405 such that the second data stream can be provided to client ($C_1$) 405. In another alternative embodiment, the second data stream may be provided to client ($C_1$) 405 through an access server ($ACS_2$) (not shown). In another alternative embodiment, application server ($APS_1$) 420 may be used to directly or indirectly provide both the first requested application and the second requested application.

As described with reference to FIGS. 2 and 3, the size and/or characteristics of the data stream requested by the access server and/or provided by the application server can vary based on the user's actions with respect to the requested application. In an exemplary embodiment, the data stream requested by the access server, provided by the application server, and submitted to the client can be based on a visible portion of an application window in which the application is placed and/or on whether the application window is active or inactive. For example, the access server can provide the client with a data stream corresponding to an active application. The data stream(s) corresponding to inactive application(s) can be based on a visible portion of the inactive application window(s).

In an alternative embodiment, any or all of application server ($APS_1$) 420, application server ($APS_2$) 425, and application server ($APS_p$) 430 may provide application data streams directly to any of the clients. In one embodiment, any of the application servers can provide an application to the client through network 400 as illustrated by dashed line 428. Alternatively, the application servers can communicate with the clients through any other network. In one embodiment, an access server may be incorporated within any of ($APS_1$) 420, application server ($APS_2$) 425, and application server ($APS_p$) 430. For example, access server ($ACS_1$) 435 can be incorporated into application server ($APS_1$) 420, an access server ($ACS_2$) (not shown) can be incorporated into application server ($APS_2$) 425, and so on. Alternatively, an access server may be incorporated into any of client ($C_1$) 405, client ($C_2$) 410, and client ($C_n$) 415.

In an exemplary embodiment, access server ($ACS_1$) 435 can communicate with access server ($ACS_m$) 440 as illustrated by dashed line 432. The access servers can communicate through network 400 or through a different network depending on the embodiment. In one embodiment, access servers can communicate to provide system 450 with redundancy such that information is not lost and/or application provision is not interrupted if one of the access servers malfunctions or goes down. The access servers can also communicate with one another to achieve load balancing among the access servers. In an exemplary embodiment, an access server can also communicate with other access servers to identify another access server which is geographically closer to a mobile client due to a change in location of the mobile client, to provide/receive access server maintenance and/or updates, to share information regarding the status of application servers and/or clients which are not connected through the access server, to discover new application servers with newer or better applications, and/or to locate clients connected to other access servers for VoIP communication with a client connected to the access server.

FIG. 5C is a block diagram illustrating an access server 570 in accordance with an exemplary embodiment. Similar to application server 540 described with reference to FIG. 5B, access server 570 can include a network interface 575, a memory 580, a central processing unit (CPU) 585, an encoder 590, input/output (I/O) ports 595, and a decoder 597. Network interface 575 can be a wireless communication card, an antenna, a cable, a telephone line, or any other conduit by which application server 570 can access and communicate across network 400 described with reference to FIG. 4. Central processing unit (CPU) 585 can be any programmable logic device capable of performing all of the instruction, logic, and mathematical processing in access server 570. Memory 580 can be coupled to CPU 585, and can be capable of storing data on access server 570. The data stored in memory 580 can include user documents, user profiles, user payment information, application server resources, client resources, application data, etc. Encoder 590 can be any software or hardware capable of compressing, encrypting, authenticating, and/or streaming data streams from access server 570 to a destination such as an application server or a client. Input/output ports 595 can be used by CPU 585 to send and receive data.

Access server 570 also includes decoder 597 which may be used to transcode a data stream between the application server and a client in cases where there is a different version of software or protocol between the application server and the client. Access server 570 can use decoder 597 to decode the data stream received from the application server and transcode the data stream such that it is compatible with the client. Alternatively, access server 570 can use encoder 590 to re-encode the data stream to make it compatible with the client. Alternatively, decoder 597 can be used for any other decoding as known to those skilled in the art. In alternative embodiments, access server 570 can include additional, fewer, or different components.

In an exemplary embodiment, the system described herein can be implemented as a global application service provider (ASP). Users can access the global ASP through their clients, which can include personal computers, personal digital assistants, cellular phones, other mobile devices, etc. The global ASP can maintain and control the access servers, which can be in communication with the clients and one or more application servers. In one embodiment, the application servers can be maintained and controlled by independent software vendors (ISVs) or dedicated hosting companies. The global ASP can mediate between the clients and the independent software vendors. The global ASP can also provide a portal which provides the users with a list of applications and/or content which the users can use, along with information on cost, amount of advertising, properties of the ISVs, etc. The global ASP can also be used to help ISVs protect their applications from piracy and also provide copy-protection for ISV-provided content. Since the application code (or content) does not leave the premises of the ISV, it would be extremely difficult for a hacker to copy the software or content. The portal can also provide users with an ISV rank based on user reviews of the ISV and/or a performance history of the ISV. In essence, the portal provided by the global ASP can act as an auction site for remote provision of applications. As a result, ISVs, both big and small, are able to easily enter the market and compete with one another.

In one embodiment, individual users may be allowed to make applications installed on their clients and/or content stored on their clients accessible through the portal. As such, the users can act as application servers, and the global ASP can coordinate distribution of the applications and content. As a result, users may be able to earn revenue off of applications or content which they have created. Alternatively, users may be able to earn revenue off of other installed applications or stored content which the users have legal permission to distribute and sell.

Billing (where appropriate) can be performed by the global ASP, or the ISVs depending on the embodiment. The cost of application use can be based on any of a number of factors, including the amount of processing strength at the ISV, the amount of memory at the ISV, the amount of resources or peripherals at the ISV, the amount of network bandwidth needed to stream the application, the cost to host the server (maintenance, technicians, electric power, and cooling), the cost of hardware at the ISV, the cost of the application licenses to the ISV, etc.

One or more flow diagrams have been used to describe exemplary embodiments. As used herein and unless otherwise stated, 'a' or 'an' can refer to 'one or more.' The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by an access server, a request, from a client, to access an application;
   determining at least one resource of the client;
   identifying one or more application servers capable of providing the requested application;
   selecting one of the one or more application servers based, at least in part, on the at least one resource of the client;
   requesting the selected application server to execute the requested application; and
   providing access to the executing application on the selected application server to the client.

2. The method of claim 1, wherein providing access to the executing application on the selected application server to the client comprises streaming at least a portion of a graphical user interface of the executing application and advertisements to the client, wherein the at least one resource of the client comprises a user preference indicating a preference for lowest cost.

3. The method of claim 1, wherein selecting the one of the one or more application servers comprises selecting the one of the one or more application servers based, at least in part, on proximity, wherein the at least one resource of the client comprises the proximity of the client to the one of the one or more application servers.

4. The method of claim 1, wherein selecting the one of the one or more application servers comprises selecting the one of the one or more application servers based, at least in part, on ability of the one of the one or more application servers to approximate a desired level of performance of application execution when compared to other application servers of the one or more application servers, wherein the at least one resource of the client comprises a user preference indicating the desired level of performance of application execution.

5. The method of claim 1, wherein selecting the one of the one or more application servers based, at least in part, on the at least one resource of the client comprises generating a list of candidate application servers of the one or more application servers and selecting the one of the one or more application servers from the list.

6. The method of claim 1, wherein selecting the one of the one or more application servers comprises determining at least one limitation of the client based on the at least one resource of the client and selecting the one of the one or more application servers based, at least in part, on at least one resource of the one or more application servers and the limitation of the client.

7. The method of claim 1, wherein providing access of the executing application on the selected application server to the client comprises streaming a display of at least a portion of a graphical user interface of the executing application to the client.

8. The method of claim 7, wherein the streaming the display of the at least the portion of the graphical user interface of the executing application to the client comprises streaming the display of the at least the portion of the graphical user interface to an active display of the client.

9. The method of claim 7, wherein the streaming the display of the at least the portion of the graphical user interface of the executing application to the client comprises dividing a display of the client into a plurality of segments and streaming the display of the at least the portion of the graphical user interface to a subset of the plurality of segments.

10. The method of claim 7, wherein the streaming the display of the at least the portion of the graphical user interface of the executing application to the client comprises determining a visible portion of an active application window of the client and streaming the display of the at least the portion of the graphical user interface to the visible portion of the active application window of the client.

11. A system comprising:
an access server comprising:
  memory; and
  a processor configured to receive, by the access server, a request, from a client, to access an application, to determine at least one resource of the client, to identify one or more application servers capable of providing the requested application, to select one of the one or more application servers based, at least in part, on the at least one resource of the client, to request the selected application server to execute the requested application, and to provide access to the executing application on the selected application server to the client.

12. The system of claim 11, wherein the processor configured to provide access to the executing application on the selected application server to the client comprises the processor configured to stream at least a portion of a graphical user interface of the executing application and advertisements to the client, wherein the at least one resource of the client comprises a user preference indicating a preference for lowest cost.

13. The system of claim 11, wherein the processor configured to select the one of the one or more application servers comprises the processor configured to select the one of the one or more application servers based, at least in part, on proximity, wherein the at least one resource of the client comprises the proximity of the client to the one of the one or more application servers.

14. The system of claim 11, wherein the processor configured to select the one of the one or more application servers comprises the processor configured to select the one of the one or more application servers based, at least in part, on ability of the one of the one or more application servers to approximate a desired level of performance of application execution when compared to other application servers of the one or more application servers, wherein the at least one resource of the client comprises a user preference indicating the desired level of performance of application execution.

15. The system of claim 11, wherein the processor configured to select the one of the one or more application servers based, at least in part, on the at least one resource of the client comprises the processor configured to generate a list of candidate application servers of the one or more application servers and to select the one of the one or more application servers from the list.

16. The system of claim 11, wherein the processor configured to select the one of the one or more application servers comprises the processor configured to determine at least one limitation of the client based on the at least one resource of the client and to select the one of the one or more application servers based, at least in part, on at least one resource of the one or more application servers and the limitation of the client.

17. The system of claim 11, wherein the processor configured to provide access of the executing application on the selected application server to the client comprises the processor configured to stream a display of at least a portion of a graphical user interface of the executing application to the client.

18. The system of claim 17, wherein the processor configured to stream the display of the at least the portion of the graphical user interface of the executing application to the client comprises the processor configured to stream the display of the at least the portion of the graphical user interface to an active display of the client.

19. The system of claim 17, wherein the processor configured to stream the display of the at least the portion of the graphical user interface of the executing application to the client comprises the processor configured to divide a display of the client into a plurality of segments and to stream the display of the at least the portion of the graphical user interface to a subset of the plurality of segments.

20. The system of claim 17, wherein the processor configured to stream the display of the at least the portion of the graphical user interface of the executing application to the client comprises the processor configured to determine a visible portion of an active application window of the client and to stream the display of the at least the portion of the graphical user interface to the visible portion of the active application window of the client.

21. A non-transitory computer readable medium comprising executable instructions, the instructions executable by a processor to perform a method, the method comprising:
  receiving, by an access server, a request, from a client, to access an application;
  determining at least one resource of the client;
  identifying one or more application servers capable of providing the requested application;

selecting one of the one or more application servers based, at least in part, on the at least one resource of the client;
requesting the selected application server to execute the requested application; and
providing access to the executing application on the selected application server to the client.

* * * * *